United States Patent [19]

Kumasaka et al.

[11] Patent Number: 4,900,083
[45] Date of Patent: Feb. 13, 1990

[54] MODULAR VEHICLE BODY AND METHOD OF BUILDING SAME

[75] Inventors: Hideyuki Kumasaka, Yokohama; Tarou Haiwara, Sagamihara; Katsumi Nakamura, Fujisawa; Kenichi Miyazaki, Sagamihara; Hiroshi Kuriyama, Yokohama; Kouji Takao, Atsugi; Keizo Inoue, Sagamihara, all of Japan

[73] Assignee: Nissan Motor Co., Ltd., Yokohama, Japan

[21] Appl. No.: 171,813

[22] Filed: Mar. 22, 1988

[30] Foreign Application Priority Data

Mar. 27, 1987 [JP] Japan .............................. 62-46112[U]
Mar. 31, 1987 [JP] Japan .................................. 62-78046

[51] Int. Cl.$^4$ .............................................. B62D 25/00
[52] U.S. Cl. ..................................... 296/197; 296/29; 296/196; 296/203; 296/210; 29/469
[58] Field of Search ................. 296/29, 191, 185-187, 296/192, 193, 194, 196, 197, 203, 210; 29/469

[56] References Cited

U.S. PATENT DOCUMENTS

| | | | |
|---|---|---|---|
| 2,389,907 | 11/1945 | Helmuth | 296/203 |
| 2,700,570 | 1/1955 | Barenyi | 296/196 |
| 2,988,397 | 6/1961 | Brueder | 296/196 |
| 3,021,172 | 2/1962 | Fiala et al. | 296/203 |
| 3,022,105 | 2/1962 | Tjaarda | 29/469 X |
| 3,541,668 | 11/1970 | Wessglls, III et al. | 296/193 X |
| 3,882,592 | 5/1975 | Mooney et al. | 29/469 |
| 4,332,012 | 5/1982 | Sekine et al. | 364/468 |
| 4,590,654 | 5/1986 | Kajiura | 29/469 X |
| 4,730,870 | 3/1988 | DeRegs | 296/197 |
| 4,759,489 | 7/1988 | Pigott | 29/469 X |

FOREIGN PATENT DOCUMENTS

| | | | |
|---|---|---|---|
| 0127225 | 12/1984 | European Pat. Off. | |
| 0142581 | 5/1985 | European Pat. Off. | |
| 178266 | 4/1986 | European Pat. Off. | |
| 0180554 | 5/1986 | European Pat. Off. | |
| 0240470 | 10/1987 | European Pat. Off. | |
| 256931 | 2/1988 | European Pat. Off. | 29/469 |
| 3119666 | 1/1982 | Fed. Rep. of Germany | 296/203 |
| 3035333 | 5/1982 | Fed. Rep. of Germany | |
| 3413228 | 10/1985 | Fed. Rep. of Germany | |
| 3536015 | 4/1986 | Fed. Rep. of Germany | |
| 62-88674 | 4/1987 | Japan | |
| 62-88675 | 4/1987 | Japan | |
| 62-88676 | 4/1987 | Japan | |
| 62-88678 | 4/1987 | Japan | |
| 626305 | 7/1949 | United Kingdom | |
| 701413 | 12/1953 | United Kingdom | 296/196 |
| 737655 | 9/1955 | United Kingdom | |
| 2187683 | 9/1987 | United Kingdom | |
| 87/03846 | 7/1987 | World Int. Prop. O. | |

OTHER PUBLICATIONS

Automotive Industries, Feb., 1986.

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

A vehicle body consists of six independent body sections, i.e., an engine compartment assembly, floor assembly, rear end assembly, a pair of body side assemblies and roof assembly. The assemblies are prepared and painted independently and then respectively provided with equipment such as an engine, suspensions, upholsteries, etc. so as to constitute an engine compartment module, floor module, rear end module, body side modules and roof module, respectively. A complete vehicle or nearly complete vehicle is obtained by joining the modules together with bolts and nuts.

1 Claim, 8 Drawing Sheets

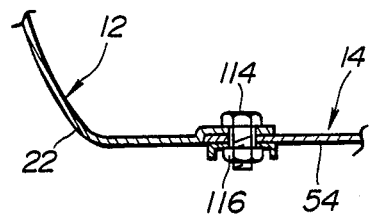
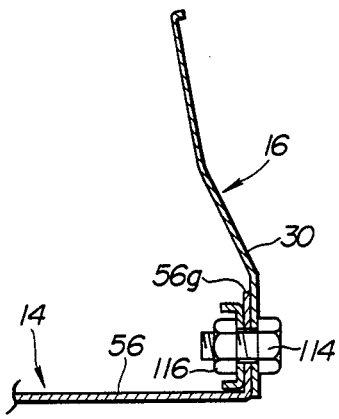
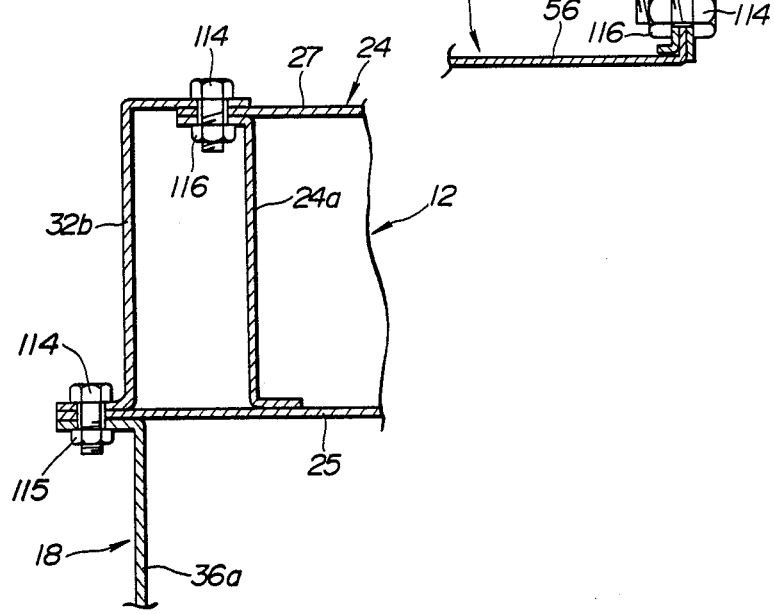

MODULAR VEHICLE BODY AND METHOD OF BUILDING SAME

BACKGROUND OF THE INVENTION

1. Field of the Invention

The present invention relates to a modular vehicle body and a method of building the same.

2. Description of the Prior Art

Unitized bodies have been used for many of automobiles, particularly for most of passenger cars. The unitized bodies however have a difficulty in installation of components and insection of same since access to the spaces for disposition of the components is obstructed by the body sections enclosing the spaces.

This is particularly true in case of a vehicle equipped with a centralized electronic control system for controlling an engine, suspension, etc. The electronic control system is disposed within a passenger compartment and installed on a dash side panel so that it can avoid heat radiating from the engine. In case of the unitized body, inspection of the engine, suspension, etc. under control of the eletronic control system must be done not only after installation of the engine in the engine compartment but after installation of the electronic control system in the passenger compartment. Accordingly, if some faults are found in the operation of the engine, suspension, etc., adjustment of the electronic control system, which must be done by a worker getting into the passenger compartment, is necessitated, resulting in the necessity of an awkward, difficult and time-consuming work and therefore an expensive assembly cost.

SUMMARY OF THE INVENTION

In accordance with the present invention, there is provided a novel vehicle body structure which is constituted by six independent vehicle body sections, i.e., an engine compartment assembly, floor assembly, rear end assembly, a pair of body side assemblies and a roof assembly.

The engine compartment assembly has a cowl box and a dash lower panel at the rear end thereof. The floor assembly has a front floor panel and a rear floor panel. The rear end assembly has a rear end panel. Each of the body side assemblies has a front pillar, rear pillar, roof side rail and a side sill. The roof assembly has a roof panel.

The assemblies are fastened together with mechanical fastening means.

In accordance with the present invention, there is also provided a novel vehicle structure which is constituted by six vehicle body modules, i.e., an engine compartment module, floor module, rear end module, a pair of body side modules and a roof module.

The engine compartment module has an engine compartment assembly and equipments including an engine, suspension, and an electronic control system therefor. The engine compartment assembly constitutes an independent vehicle body section and has a cowl box and a dash lower panel at the rear end thereof.

The floor module has a floor assembly and equipments including a rear axle and suspension. The floor assembly constitutes an independent vehicle body section and has a front floor panel and rear floor panel.

The rear end module has a rear end assembly and equipments including a rear combination lamp. The rear end assembly constitutes an independent vehicle body section and has a rear end panel.

The pair of body side modules each have, though symmetrical about a vehicle body longitudinal axis, a vehicle body side assembly and equipments including a plurality of trim members. The body side assembly constitutes an independent body section and has a front pillar, rear pillar, side sill and a roof side rail.

The roof module has a roof assembly and equipments including a ceiling member. The roof assembly constitutes an independent vehicle body section and has a roof panel.

The assemblies are fastened together by mechanical fastening means.

In accordance with the present invention, there is further provided a novel method of producing a vehicle body.

The method comprises preparing an engine compartment assembly, floor assembly, rear end assembly, a pair of body side asesmblies and roof assembly which constitute independent body sections, respectively, painting the engine compartment assembly, floor assembly, rear end assembly, body side assembly and roof assembly and mechanically fastening the engine compartment assembly, floor assembly, rear end assembly, body side assemblies and roof assembly together.

In accordance with the present invention, there is further provided a novel method of building a vehicle structure.

The method comprises preparing an engine compartment assembly, floor assembly, rear end assembly, a pair of body side assemblies and roof assembly which constitute independent body sections, respectively, painting the engine compartment assembly, floor assembly, rear end assembly, body side assemblies and roof assembly, providing equipments to the engine compartment assembly, floor assembly, rear end assembly, body side assemblies and roof asssembly, and mechanically fastening the engine compartment assembly, floor assembly, rear end assembly, body side assemblies and roof assembly together.

The above structures and methods are effective for solving the above noted problems inherent in the prior art vehicle bodies.

It is accordingly an object of the present invention to provide a novel vehicle body structure which makes it possible to attain the installation and inspection of devices, components and upholsteries with ease and efficiency.

It is another object of the present invention to provide a novel vehicle structure which can be produced with ease and efficiency.

It is a further object of the present invention to provide a novel vehicle structure which can reduce the assembling expense considerably.

It is a further object of the present invention to provide a novel vehicle structure which is suited for manufacture and assembly using robots.

It is a further object of the present invention to provide a novel vehicle structure which makes it possible to attain various types of vehicles with ease and efficiency.

It is a further object of the present invention to provide a novel method of producing a vehicle body structure of the above described character.

It is a further object of the present invention to provide a novel method of producing a vehicle structure of the above described character.

BRIEF DESCRIPTION OF THE DRAWINGS

FIGS. 3 to 13 are enlarged sectional views taken along the lines III—III, IV—IV, V—V, VI—VI, VII—VII, VIII—VIII, IX—IX, X—X, XI—XI, XII—XII and XIII—XIII of FIG. 2, respectively;

DETAILED DESCRIPTION OF THE PREFERRED EMBODIMENTS

Figure 1:
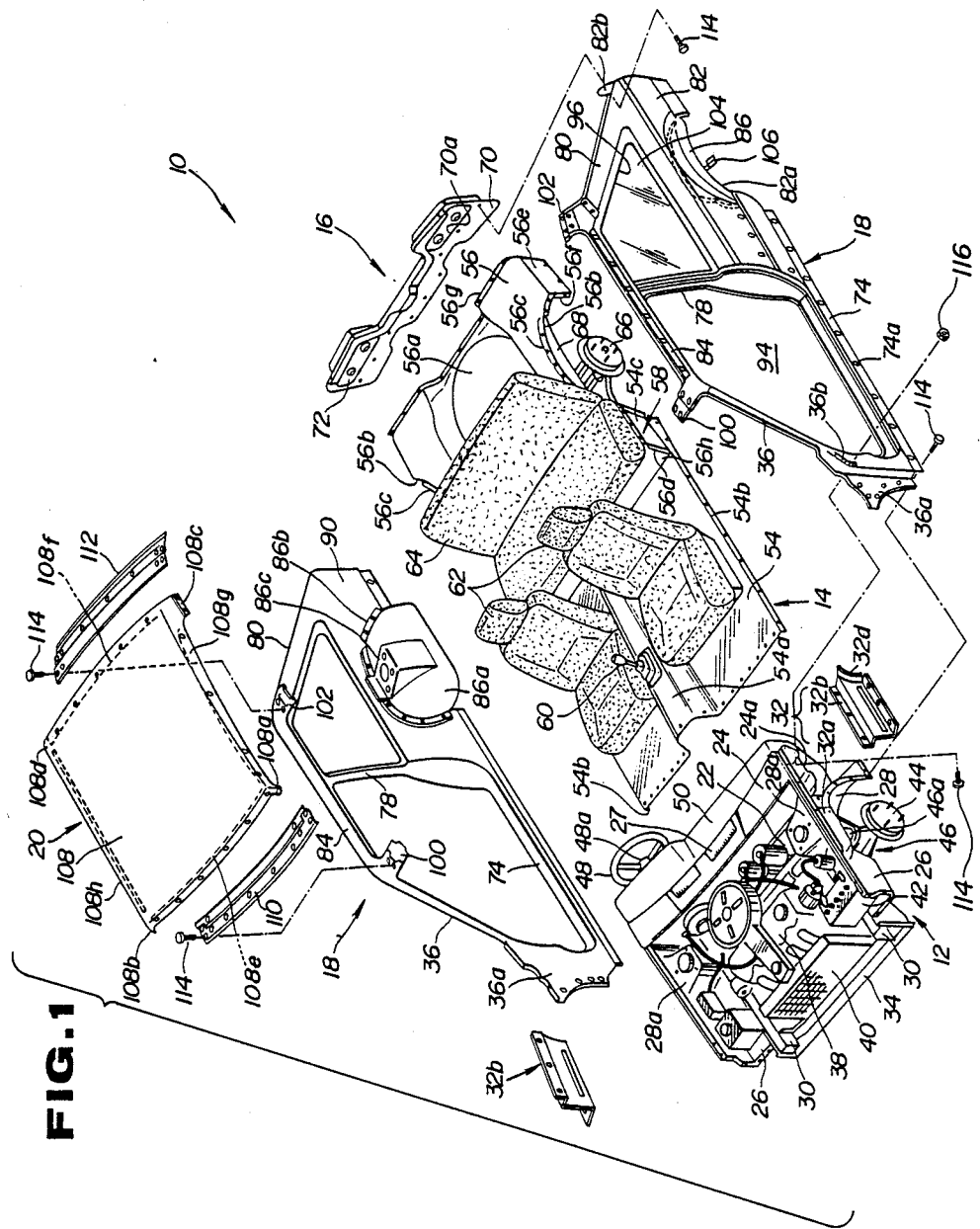
FIG. 1 is an exploded view of a vehicle body according to an embodiment of the present invention, together with chassis sub-assemblies, upholsteries, etc.

Referring to FIGS. 1 to 13 in which like parts which are symmetrical about a longitudinal line of a vehicle body are designated by the same reference numerals, a vehicle body according to an embodiment of the present invention is generally indicated by the reference numeral 10 and consists of six separate body sections, i.e., an engine compartment assembly 12, floor assembly 14, rear end assembly 16, a pair of body side assemblies 18 and 18, and a roof assembly 20.

The engine compartment assembly 12 consists of a dash lower panel 22, cowl box or air box 24 located above the dash lower panel 22 and extending laterally of the vehicle body 10 and a pair of hood ledge panels 26 and 26 extending fowardly from the lateral ends of the dash lower panel 22 and the cowl box 24. Each hood ledge panel 26 is formed with a wheel house 28 projecting laterally inwardly of the vehicle body 10. A pair of longitudinal members 30 and 30 are secured to the lower end portions of the hood ledge panels 26. A front cross member 34 spans the longitudinal members 30 and 30 and is secured at the laterally opposed ends to same. A reinforcement 32 is secured to the upper end portion of each hood ledge panel 26. The reinforcement 32 consists of a reinforcement member 32a secured to the upper end portion of each hood ledge panel 26 and a reinforcement member 32b spanning a cowl box side member 24a and a bracket 36b. The cowl box side member 24a is located rearward of each hood ledge panel 26 to cover each lateral end of the cowl box 24. The bracket 36b is secured to the lower end portion of a front pillar 36 to project laterally outwards therefrom and adapted to be joined with a rear lateral flange 32d of the reinforcement member 32b by nuts 114 and bolts 116. The cowl box 24 is constituted by a dash upper panel 25 and a cowl top grille 27 and so formed as to have a box-like closed section.

The engine compartment assembly 12 is painted and then equipped with devices and components as an engine 38, radiator 40, battery 42, front axle unit 44, front suspension system 46 and steering linkage (not shown), steering wheel 48, instrument panel 50, etc. The engine 38 is installed on the longitudinal members 30 and 30 by way of mounting insulators (not shown). The radiator 40 is installed on the front cross member 34. The front suspension system 46 includes a pair of struts, though only one 46a is shown, the upper end of each of which is supported on a strut holder 28a provided to each wheel house 28. The front suspension system 46 further includes a linkage 46b as a lower link, upper link, etc. which are connected to the longitudinal members 30 and 30. The steering wheel 48 is connected, though not shown, to a steering gear which is in turn connected to the steering linkage by way of a steering shaft rotatably supported on a steering column 48a installed on the instrument panel 50. The instrument panel 50 is located on the vehicle cabin side of the cowl box 24 and attached to same.

The floor assembly 14 includes a front floor panel 54 and a rear floor panel 56. The front floor panel 54 has at a laterally central portion thereof an upwardly protruded tunnel 54a, and also has at the lateral ends thereof depending flanges 54b and at the rear end thereof an upstanding flange 54c. The rear floor panel 56 has a downwardly recessed portion 56a for accomodation of a spare tire. The rear floor panel 56 also has at the lateral ends thereof cut or notched portions 56b. Almost all of the peripheral edge of each cut portion 56b and each lateral end of the rear floor panel 56 located more forward than each cut portion 56b are bent upwardly to provide a peripheral flange 56c and a lateral end flange 56d. Each lateral end of the rear floor panel 56 located more rearward than each cut portion 56b is provided with a depending rear end flange 56e. A rim 56f is provided to extend inwardly from the front end of the rear end flange 56e and downwardly from the rear peripheral portion of the cut portion 56b. The rear floor panel 56 has at the rear end thereof an upstanding flange 56g. The rear floor panel 56 has at the front end thereof a depending flange 56h. The front flange 56h of the rear floor panel 56 and the rear flange 54c of the front floor panel 54 are arranged so as to be spaced a predetermined distance from each other in the longitudinal direction of the vehicle body 10. The front flange 56h is secured at the lower end thereof to the upper face of the front floor panel 54 whilst the rear flange 54c is secured at the upper end thereof to the lower face of the rear floor panel 56 so that a laterally elongated box-like closed sectional portion 58 is formed which is effective for assembling the front floor panel 54 and the rear floor panel 56 integrally and rigidly.

The floor assembly 14 is painted and is equipped with devices, components and upholsteries as a shift lever unit 60, front seats 62, rear seat 64, rear axle unit 66 and, though not shown, spair tire, insulators, carpets, etc. The shift lever unit 60 is installed on the tunnel portion 54a. The front seats 62 are installed on the opposite sides of the tunnel portion 54a. The rear seat 64 is installed on the upper wall of the box-like closed sectional portion 58. The rear axle unit 66 is arranged to extend laterally of the vehicle body 10 and installed on the lower face of the rear floor panel 56 by way of a pair of side members 68 and 68.

The rear end assembly 16 is provided with a rear end panel 70. The rear end panel 70 has at the opposite lateral end portions thereof openings 70a and 70a. The rear end assembly 16 is painted and equipped with devices and upholsteries as a combination lamp unit 72 installed in the openings 70a and 70a and upholsteries as trim members (not shown).

Each body side assembly 18 includes a side sill 74, front pillar 36, center pillar 78, rear pillar 80, rear fender 82, roof side rail 84 and a rear wheel house 86. The side sill 74 extends longitudinally of the vehicle body 10 and has a box-like closed section. The front pillar 36 has a lower end disposed adjacent the front end of the side sill 74 and extends upwardly and rearwardly therefrom whilst the center pillar 78 has a lower end disposed adjacent the intermediate portion of the side sill 74 and extends upwardly therefrom. A rear fender 82 is disposed rearward of the lower portion of the center pillar 78 and cooperates with a body side inner panel 90 to form a box-like closed section. The rear pillar 80 is disposed rearward of the rear fender 82 to extend upwardly and forwardly therefrom. The roof side rail 84 is arranged to interconnect the upper ends of the front, center and rear pillars 76, 78 and 80. The body side assembly 18 has an opening 94 surrounded by the roof side rail 84, front pillar 36, center pillar 78 and side sill 74 and an opening 96 surrounded by the roof side rail 84, center pillar 78, rear pillar 80 and the rear fender 82. Though not shown, a front door is adapted to be installed in each opening 94. The rear wheel house 86 consists of a wheel house inner 86a projecting inwardly of the vehicle cabin and a wheel house outer (not shown). The upper peripheral ends of the wheel house inner 86a and the wheel house outer (not shown) are joined at a flange 86b which is in turn secured to the periphery of a nearly semicircular cut (not shown) formed in the body side inner panel 90 whilst the lower peripheral edge of the wheel house outer is secured to the peripheral edge of a nearly semi-circular cut 82a formed in the rear fender 82. The wheel house outer is joined with the side sill 74 covered by the rear fender 82 in the manner of butt joint. Each wheel house inner 86a is formed with a strut holder 86c projecting inwardly of the vehicle cabin. The front pillar 36 has at the lower end thereof a dash side panel portion 36a in the form of a lingitudinal flange and a bracket 36b projecting laterally outwardly. A pair of brackets 100 and another pair of brackets 102 are respectively provided at the joint between the front pillar 36 and the roof side rail 84 and the joint between the rear pillar 80 and the roof side rail 84. The rear fender 82 is provided at the rear end thereof with a bracket 82b projecting laterally inwardly of the vehicle body 10.

The body side assemblies 18 and 18 are painted and equipped with devices, components and upholsteries as a window glass 104, strut 106, trim members, etc. The window glass 104 is installed in the rear opening 96. The strut 106 is supported at the upper end thereof upon the strut holder 86c.

The roof assembly 20 includes a roof panel 108, front roof rail 110 and a rear roof rail 112. The roof panel 108 is formed into a nearly square shape and has at each corner portions extensions 108a, 108b, 108c and 108d which are smoothly consecutive with the outer surfaces of the front pillars 36 and 36 and rear pillars 80 and 80. The roof panel 108 also has brackets 108e, 108f, 108g and 108h at the front, rear and lateral ends thereof, respectively. The front and rear roof rails 110 and 112 are respectively comprised of upper panels and lower panels which are joined to have a box-like closed section and extend laterally of the vehicle body 10. The front roof rail 110 is attached to the roof panel 108 by way of the bracket 108e whilst the rear roof rail 112 is by way of the bracket 108f.

The roof assembly 20 is painted and, though not shown, equipped with devices, components and upholsteries such as a room lamp unit, ceiling member, etc.

Figure 2:
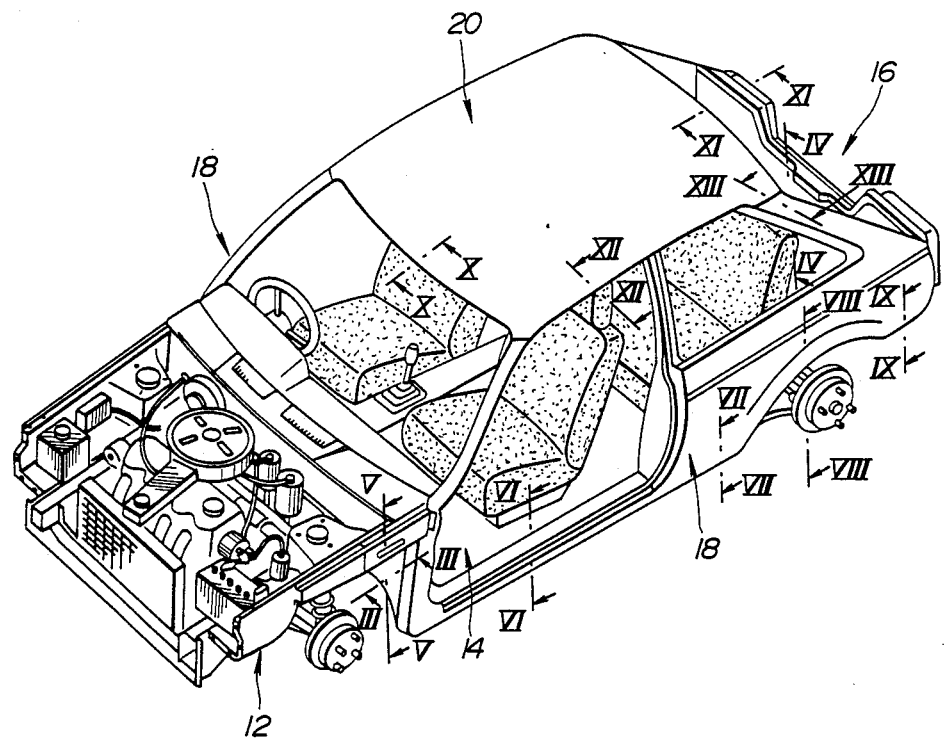
FIG. 2 is a perspective view of the vehicle body of FIG. 1 in its assembled state.
Figure 6:
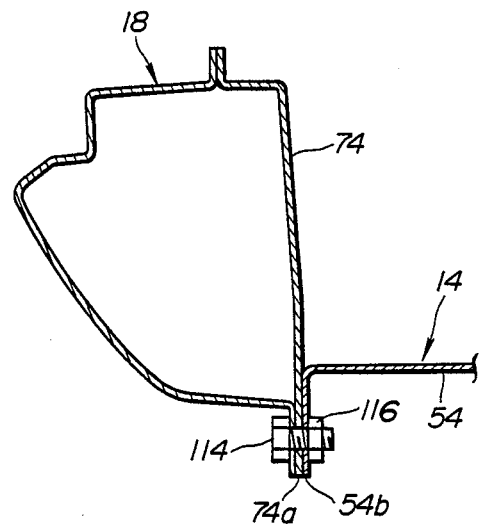
Figure 7:
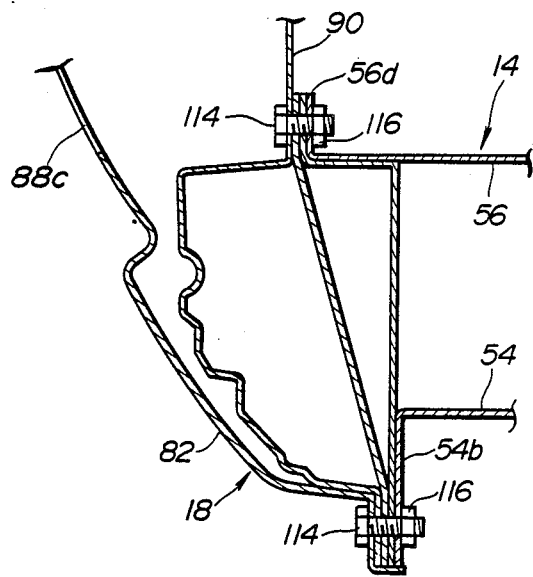
Figure 8:
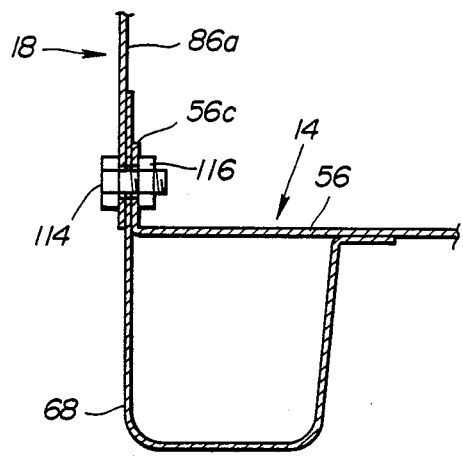
Figure 9:
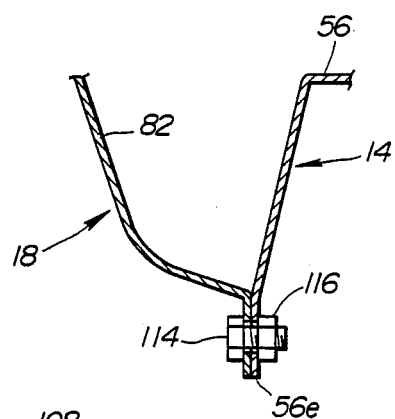
Figure 10:
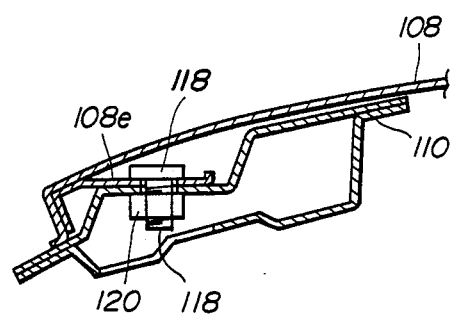
Figure 11:
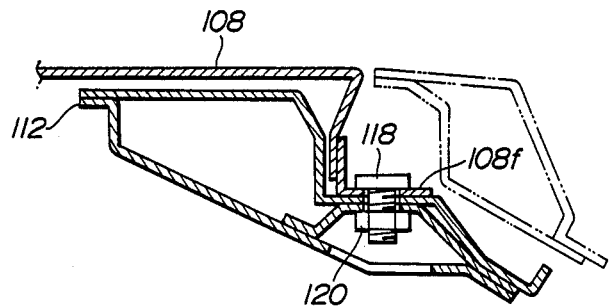
Figure 12:
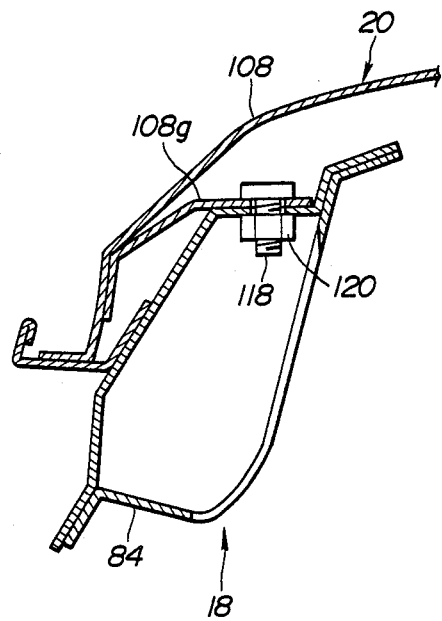
Figure 13:
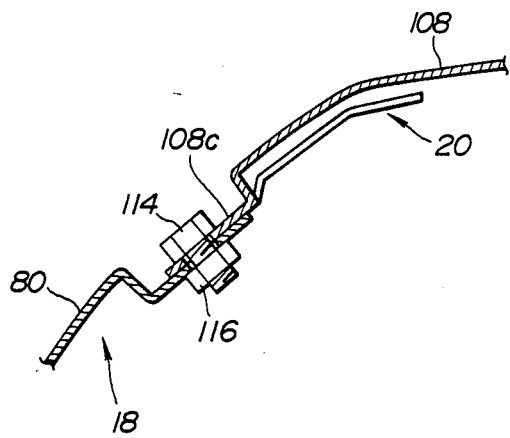

The foregoing vehicle structure is assembled as follows. Firstly, the engine compartment assembly 12, floor assembly 14, rear end assembly 16, body side assembies 18 and 18 and roof assembly 20 are prepared independently, i.e., fabricated and assembled independently. The assemblies are then painted and equipped with devices, components and upholsteries, independently. Then, as shown in FIG. 3, the front end of the front floor panel 54 is placed under the lower end of the dash lower panel 22 and fastened to same with bolts 114 and nuts 116 whilst at the same time, as shown in FIG. 4, the lower end of the rear end assembly 16 is placed on the rear flange 56g of the rear floor panel 56 and fastened to same with bolts 114 and nuts 116, whereby to join the engine compartment assembly 12 and rear end assembly 16 to the floor assembly 14. Thereafter, the body side assemblies 18 and 18 are bolted to the floor assembly 14, i.e., as seen from FIG. 1, the dash side panel portion 36a of each body side member 18 is bolted to the rear upper end portion of the hood ledge panel 26 and a peripheral end portion of the front wheel house 28. Thereafter, as shown in FIG. 5, each reinforcement member 32b is so arranged as to extend between the dash side panel portion 36a and the cowl box side member 24a. The reinforcement member 32b, cowl box side member 24a, dash upper panel 25 and the dash side panel portion 36a are fastened together with bolts 114 and nuts 116. Further, as shown in FIG. 6, the lower flange 74a of the side sill 74 is fastened to the lateral end flange 54b of the front floor panel 54 with bolts 114 and nuts 116, which bolts 114 are disposed in place by access thereto from the outside of the vehicle body 10 whilst, as shown in FIG. 7, the body side inner panel 90 is secured to the lateral end flange 56d of the rear floor panel 56 with bolts 114 and nuts 116, which bolts 114 are disposed in place by access thereto through the access holes 88c. The body side inner 90 is also fastened at a portion adjacent the center pillar 78 to the lateral flange 54b of the front floor panel 54 with bolts 114 and nuts 116. The lower end of the rear wheel house inner 86a is fastened to the flange 56c at the periphery of the cut portion 56b with bolts 114 and nuts 116 as shown in FIG. 8. The lower end of the rear fender 82 is secured to the rear lateral flange 56e of the rear floor panel 56 with bolts 114 and nuts 116 as shown in FIG. 9. The rear end assembly 16 is fastened to the flange 82b of the rear fender 82 with bolts 114 and nuts (not shown) as shown in FIG. 1, which bolts 114 are disposed in place by access thereto from the inside of the vehicle cabin. The lower portion of each strut 106 is connected to the rear axle unit 66 of the floor assembly 14. Then, the roof assembly 20 is bolted to the body side assemblies 18 and 18, i.e., as shown in FIG. 1, the lateral end portions of the front roof rail 110 and the rear roof rail 112 are bolted 114 to the brackets 100 and 102 at the front and rear ends of each body side assembly 18, and thereafter as shown in FIGS. 10 to 12 the brackets 108e, 108f, 108g and 108h of the roof panel 108 are fastened to the front roof rail 110, rear roof rail 112 and roof side rails 84 and 84 with bolts 118 and nuts 120, which bolts 118 are welded to the brackets 108e, 108f, 108g and 108h prior to the assembly and which nuts 120 are disposed in place by access thereto from the inside of the vehicle cabin. In this connection, it will be understood that the foregoing nuts 114 are welded to the corresponding panels prior to the assembly. As shown in FIG. 13, the extension 108c of the roof panel 108 is fastened to the upper portion of the rear pillar 80 with a bolt 114 and a nut 116. Other extensions 108a, 108b and 108d are similarly fastened to the front and rear pillars 36 and 80, respectively. By the above assembly, the vehicle body shown in FIG. 2 is obtained. The vehicle body is then equipped with, though not shown, a front unit including a front bumper, radiator grille, head lamp, etc. and devices and components as a hood, windshield, back door, rear bumper, side doors, front wheels, rear wheels, etc., whereby a two-door sedan hatchback type vehicle is completed.

Figure 14:
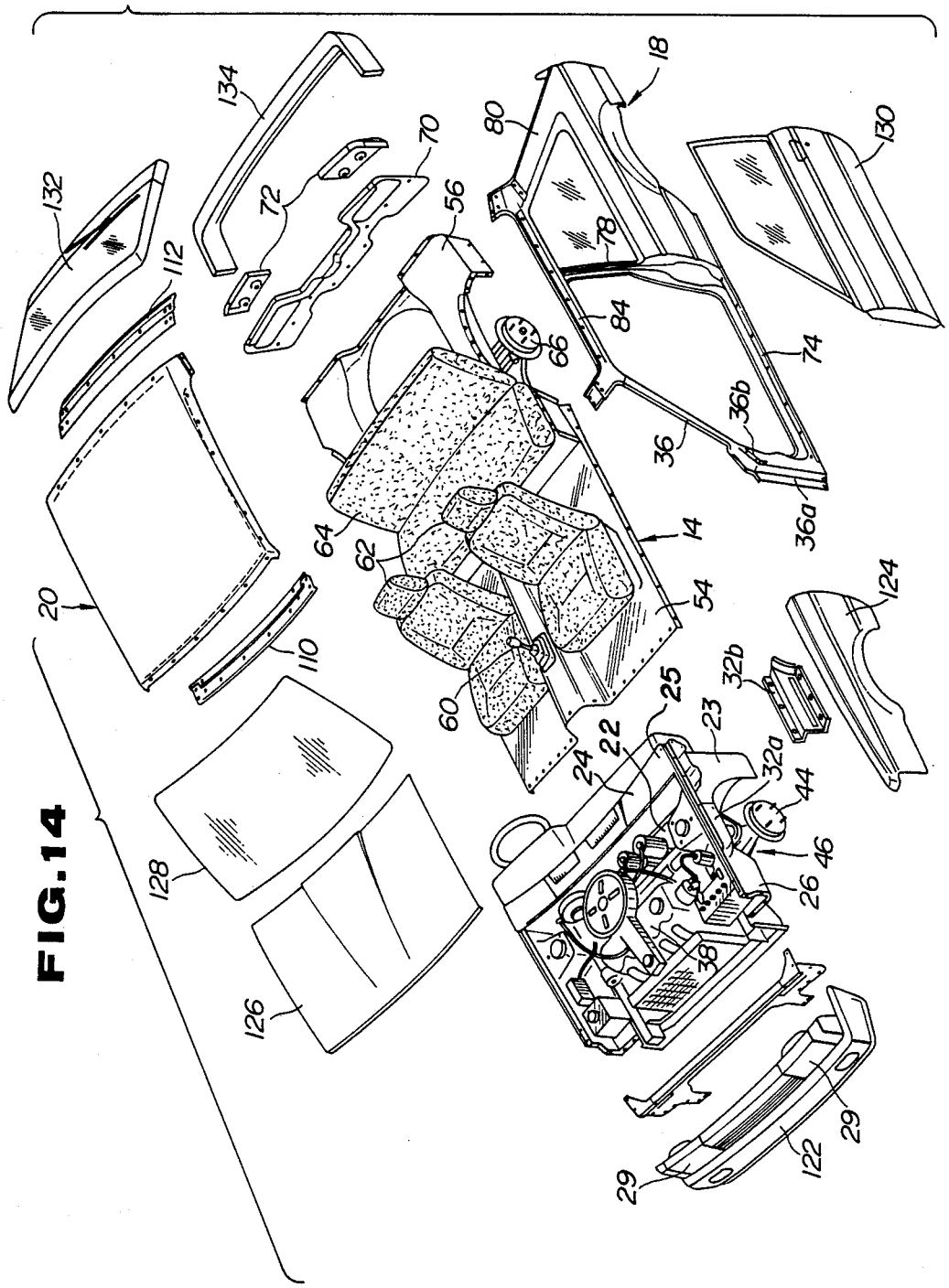
FIG. 14 is a view similar to FIG. 1 but showing another embodiment of the present invention.
Figure 15:
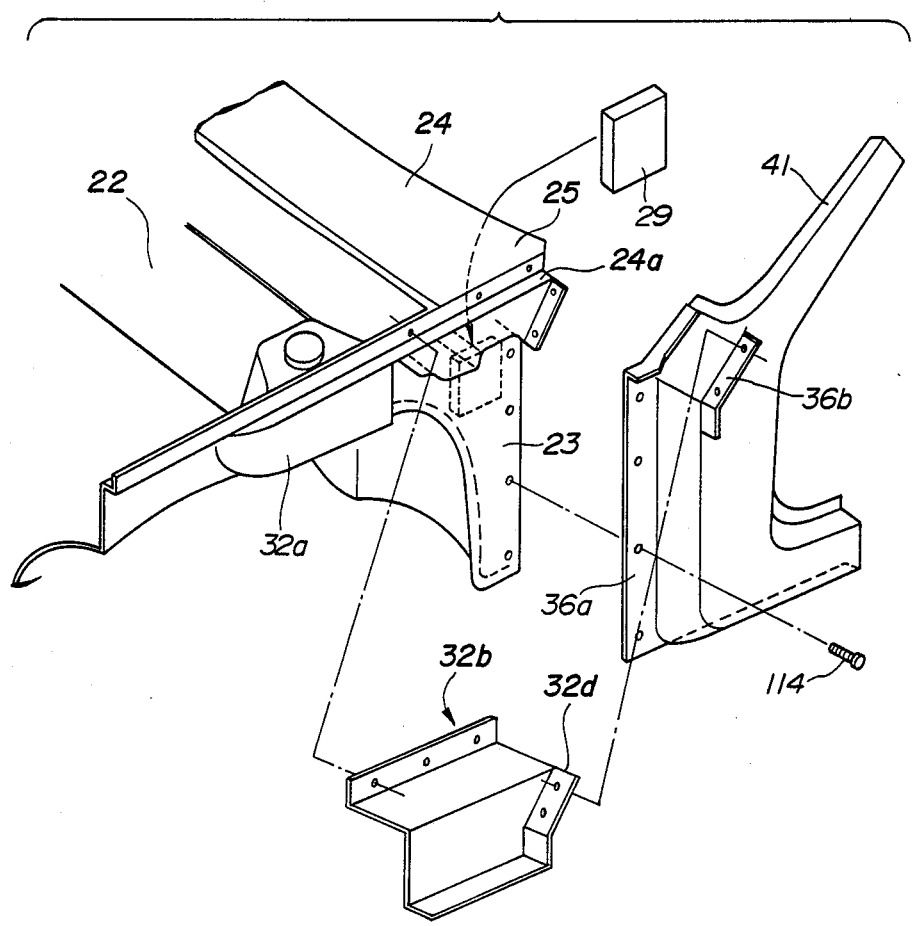
FIG. 15 is an enlarged exploded view of a principal portion of the vehicle body of FIG. 14.

Referring to FIGS. 14 and 15 in which parts and units similar to those of the previous embodiment are designated by the same reference numerals, the cowl box 24 which is partly consituted by the dash upper panel 25 and connected to the dash lower panel 22 is so formed as to have a box-like closed section. The dash lower panel 22 is connected at the opposite lateral ends thereof to dash side panels 23 and 23 which are in turn connected at the upper ends thereof to the dash upper panel 25. As shown in an enlarged scale in FIG. 15, a centralized electronic control unit 29 as a control unit for the engine 38, front suspension 46, head lamp 29, fuse box (not shown), etc. is installed on one of the dash side panels 23 and 23. In this connection, it is to be noted that inspection of the engine, suspension, etc. can be performed when the engine compartment assembly 12 is completed. Such inspection can be done with ease and efficiency since all-round access to the engine compartment assembly is attained.

In FIG. 14, indicated by the reference numeral 122 is a front bumper, by 124 a front fender, by 126 an engine hood, by 128 a windshield, by 130 a front door, by 132 a back door and by 134 a rear bumper. These are installed in place at the final stage of the assembly.

Except for the above, this embodiment is substantially similar to the previous embodiment.

From the foregoing, it will be understood that the vehicle body structure modularized according to the present invention makes it possible to attain installation and inspection of equipments as an engine, suspension, electronic control system therefor, etc. with ease and efficiency since the assemblies are accessible from all sides thereof, i.e., all-round access to each assemblies is available.

It will be further understood that the vehicle body structure is suited for assembly using robots since the robots can be less simple not only in operation or movement but in structure of themselves.

It will be further understood that equipments of each assembly, e.g., equipments of the engine compartment assembly as the engine, suspension, steering, brake, etc. can be subjected to inspection prior to assembly thereof with other assemblies, faults can be found for repairment and replacement at an early stage of the assembly.

It will be further understood that the vehicle body structure of this invention makes it possible to attain various types of vehicles with ease and efficiency since each vehicle body assembly is replaceable with another kind.

While the present invention has been described and shown as above, this is not limitative. For example, the present invention is not limited to a vehicle of a two-door sedan hatchback type but can be applied to various types other than the type shown.

What is claimed is:

1. A vehicle structure comprising:
   an engine compartment module having an engine compartment assembly and equipment including an engine, suspension and an electronic control system therefor, said engine compartment assembly constituting an independent vehicle body section and having a cowl box and a dash lower panel at the rear end thereof;
   a floor module having a floor assembly and equipment including a rear axle and suspension, said floor assembly constituting an independent vehicle body section and having a front floor panel and rear floor panel;
   a rear end module having a rear end assembly and equipment, said rear end assembly constituting an independent vehicle body section and having a rear end panel;
   a pair of body side modules each having, though symmetrical about a vehicle body longitudinal axis, a vehicle body side assembly and equipment, said body side assembly constituting an independent body section and having a front pillar, rear pillar, side sill and a roof side rail;
   a roof module having a roof assembly and equipment, said roof assembly constituting an independent vehicle body section and having a roof panel; and
   mechanical fastening means for mechanically fastening said engine compartment assembly, floor assembly, rear end assembly, body side assemblies and roof assembly together;
   said engine compartment assembly having a hood ledge panel at each lateral end thereof, said body side assembly having a dash side member projecting forwardly from a lower end of said front pillar end fastened to said hood ledge panel by said mechanical fastening means;
   each of said body side assemblies further having a flange projecting laterally from said lower end of said front pillar, said engine compartment assembly further having a reinforcement member fastened at an upper end to said cowl box and at the lower end to said dash side member by said fastening means, said reinforcement member having at a rear end a flange fastened to said flange of said body side member by said mechanical fastening means.

* * * * *